United States Patent
Vetrovec et al.

(10) Patent No.: US 7,463,667 B2
(45) Date of Patent: Dec. 9, 2008

(54) SOLID-STATE LASER AND MULTI-PASS RESONATOR

(75) Inventors: Jan Vetrovec, Larkspur, CO (US); Leo Schirber, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 11/164,422

(22) Filed: Nov. 22, 2005

(65) Prior Publication Data
US 2007/0116081 A1 May 24, 2007

(51) Int. Cl.
*H01S 3/08* (2006.01)
(52) U.S. Cl. .......................... 372/99; 372/107
(58) Field of Classification Search .............. 372/99
See application file for complete search history.

(56) References Cited

U.S. PATENT DOCUMENTS

| | | | |
|---|---|---|---|
| 4,752,130 A * | 6/1988 | George et al. | 356/334 |
| 5,113,408 A | 5/1992 | Bihler | |
| 5,255,275 A * | 10/1993 | Motegi | 372/99 |
| 5,553,088 A | 9/1996 | Brauch et al. | |
| 6,108,357 A | 8/2000 | Unternahrer | |
| 6,198,069 B1 * | 3/2001 | Hackel et al. | 219/121.6 |
| 6,339,605 B1 | 1/2002 | Vetrovec | |
| 6,603,793 B2 | 8/2003 | Vetrovec | |
| 6,625,193 B2 | 9/2003 | Vetrovec | |
| 6,888,872 B2 | 5/2005 | Vetrovec | |
| 2002/0172253 A1 * | 11/2002 | Vetrovec | 372/95 |
| 2004/0233960 A1 | 11/2004 | Vetrovec | |

FOREIGN PATENT DOCUMENTS
WO  2004006395  1/2004

OTHER PUBLICATIONS
United Kingdom, Combined Search and Examination Report, corresponding to United Kingdom Patent Application No. GB0622617.9, dated Mar. 9, 2007.

* cited by examiner

*Primary Examiner*—Minsun Harvey
*Assistant Examiner*—Patrick Stafford
(74) *Attorney, Agent, or Firm*—Charles L. Moore; Moore & Van Allen, PLLC

(57) ABSTRACT

A laser system may include a solid-state laser gain material (LGM) module. The system may also include a multi-pass resonator including a plurality of relay mirrors. The plurality of mirrors may be grouped at least in pairs. A first mirror of each pair of relay mirrors may be positioned to cause a laser beam from the LGM module incident on the first mirror to be reflected to the second mirror, and the second mirror may be positioned to reflect the laser beam back to the LGM module for further amplification. The multi-pass resonator may be configured to provide a high-quality laser beam in the fundamental mode.

25 Claims, 4 Drawing Sheets

SOLID-STATE LASER AND MULTI-PASS RESONATOR

BACKGROUND OF THE INVENTION

The present invention relates to lasers and more particularly to a solid-state laser or the like and a multi-pass resonator.

Solid-state disk lasers and the like are being used in many new applications. Examples of such applications may include but is not necessarily limited to military laser target illuminators or designators and commercial laser material processing applications such as cutting, welding, drilling or the like. Such applications typically require laser powers between about 5 kW and about 10 kW. A single solid-state disk laser may be able to generate enough power for an industrial laser device; however, the amplifier disk may be relatively thin, about 2.5 mm, which may translate to a rather short gain length. Consequently, if a single solid-state disk laser amplifier is used in a traditional single pass resonator, such as the single-pass laser resonator 100 illustrated in FIG. 1, the resonator gain would be too low to buildup enough recirculating power to saturate the solid-state gain medium of the disk laser 102. In FIG. 1, the solid-state disk laser (SSDL) 102 may be thermally coupled to a heat sink 104. Pump beams 106 may be directed on the SSDL 102 to generate an amplified beam 108 directed through an output coupler 110. A reflective coating 112 may be disposed between the SSDL 102 and the heat sink 104 on a surface of the SSDL 102.

BRIEF SUMMARY OF THE INVENTION

In accordance with an embodiment of the present invention, a laser system may include a solid-state laser gain material (LGM) module. The system may also include a multi-pass resonator including a plurality of relay mirrors grouped at least in pairs. A first mirror and a second mirror of each pair of relay mirrors may be positioned to cause a laser beam from the LGM module incident on the first mirror to be reflected to the second mirror and to cause the second mirror to reflect the laser beam back to the LGM module for further amplification. This configuration increases the resonator gain length and by superimposing beams from multiple passes, the resonator greatly improves laser medium saturation and power extraction.

In accordance with an embodiment of the present invention, the solid-state laser and multi-pass resonator may be usable with or mounted on a mobile platform, such a military vehicle or the like for applications that may include, but are not necessarily limited to laser target illuminators, designators or similar applications. The present invention may also be used in commercial applications, for example, material processing such as cutting, welding, drilling or like purposes.

In accordance with another embodiment of the present invention, a laser system may include a solid-state laser gain material (LGM) module. The laser system may also include a multi-pass resonator to provide an amplified fundamental mode laser beam. The multi-pass resonator may include a plurality of relay mirrors grouped at least in pairs. A first mirror and a second mirror of each pair of relay mirrors may be positioned to cause the laser beam from the LGM module incident on the first mirror to be reflected to the second mirror and to cause the second mirror to reflect the laser beam back to the LGM module for further amplification. An output coupler may be provided to substantially pass the amplified laser beam from the multi-pass resonator. The system may also include an end mirror to direct the amplified laser beam to the output coupler.

In accordance with another embodiment of the present invention, a method of making a laser system may include providing a LGM module. The method may also include providing a multi-pass resonator including a plurality of relay mirrors and grouping the plurality of relay mirrors at least in pairs. The method may further include positioning a first mirror of each pair of mirrors to receive a laser beam directed from the LGM module and to reflect the laser beam to a second relay mirror in the pair of mirrors. The method may also include positioning the second relay mirror to reflect the laser beam back to the LGM module.

In accordance with another embodiment of the present invention, a method to condition a laser beam may include reflecting the laser beam multiple times between a LGM module and a plurality of relay mirrors. The plurality of relay mirrors may be grouped at least in pairs. A first mirror and a second mirror of each pair of relay mirrors may be positioned to cause a laser beam from the LGM module incident on the first mirror to be reflected to the second mirror and to cause the second mirror to reflect the laser beam back to the LGM module for further amplification.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
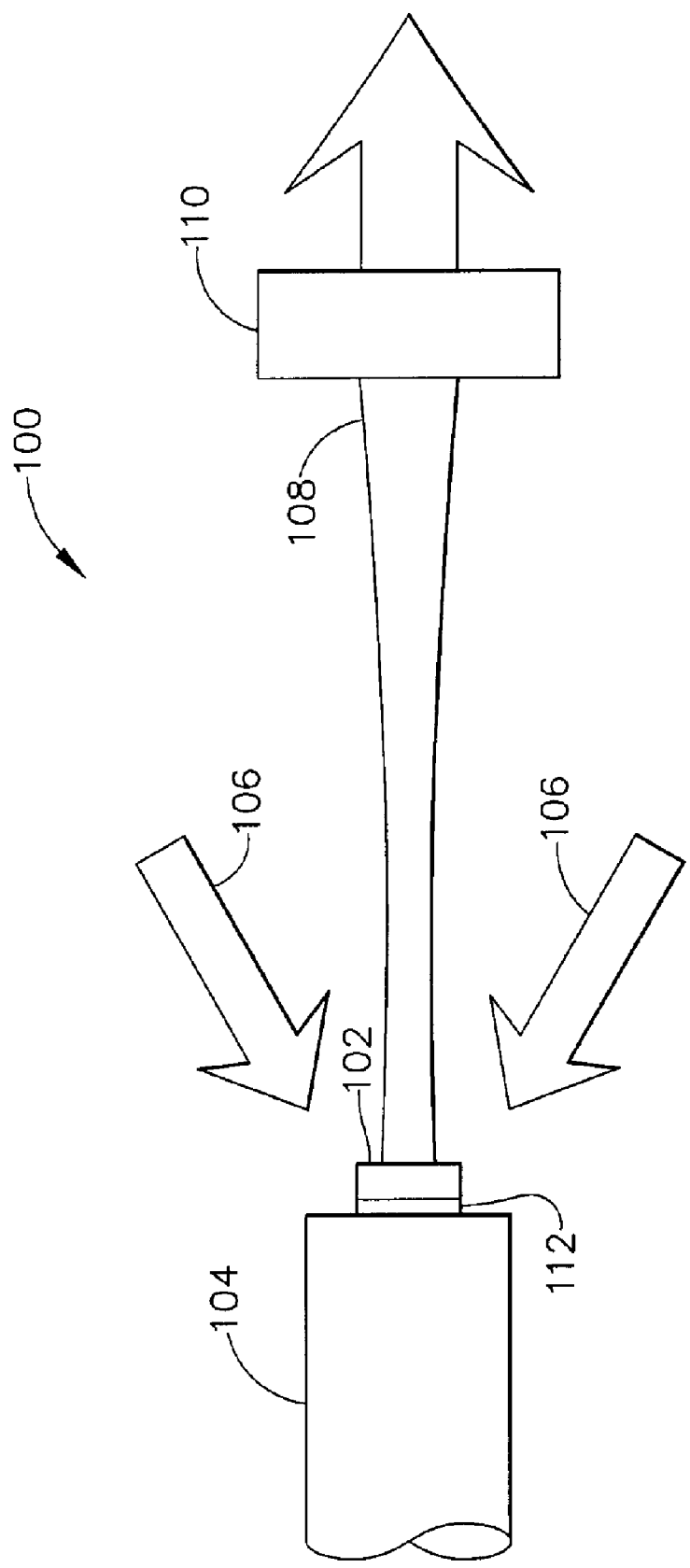
FIG. 1 is a block diagram of an example of a prior art single-pass laser resonator.

The following detailed description of embodiments refers to the accompanying drawings, which illustrate specific embodiments of the invention. Other embodiments having different structures and operations do not depart from the scope of the present invention.

The following terms and definitions are provided in describing the present invention and the improvements provided thereby.

"Laser gain medium" or "LGM" may refer to an optical material having a host lattice doped with suitable ions, which may be pumped by an external source of laser or other optical radiation to a laser transition. Examples of host lattice material that may be used in conjunction with the present invention may include yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass, sapphire or similar materials. The host material may be in a single crystal form or in a poly-crystalline (ceramic) form. Suitable dopants for such lasing mediums may include titanium (Ti), copper (Cu), cobalt (Co), nickel (Ni), chromium (Cr), cesium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb). Optical pump sources may be selected based on the absorption characteristics of the selected laser gain medium. For example, semiconductor diode lasers may be used for the optical pump source. The present invention is not intended to be limited to any specific lasing or laser gain material, or a specific pump source.

"Undoped optical medium" may refer to an optical material which is preferably substantially free of any substances that can absorb optical pump radiation. The undoped medium may be of the same host material as the laser gain medium but substantially not doped. In some embodiments of the present invention, however, undoped optical medium may be slightly doped with ions which may absorb optical radiation at the wavelengths of the optical pump and/or the laser gain transition, but are not pumped to a population inversion. Undoped optical medium may be bonded to selected surfaces of the laser gain medium by a fusion bond, or diffusion bond, or other suitable means. Such bonds must be highly transparent at the laser wavelength as well as pump wavelengths. A refractive index of the undoped optical medium and the bond are preferably closely matched to that of the laser gain medium. A suitable bond can be produced by fusion bonding, diffusion bonding, or optical contacting followed by heat treatment. Examples of optical contacting followed by heat treatment are described in the U.S. Pat. Nos. 5,441,803, 5,563,899, and 5,846,638 by Helmuth Meissner. Optical medium of this type may be obtained from Onyx Optics in Dublin, Calif. If the host medium is optical glass, doped and undoped sections may be readily attached by fusion bonding produced by casting. This process is available from Kigre Inc. in Hilton Head, S.C. If the host material is in ceramic form, such bond may be produced during a sintering process. An example of such a process is available from Konoshima Chemical Company LTD of Kagawa, Japan.

"ASE absorption cladding" may refer to an optical material capable of absorbing optical radiation at the wavelengths of one or more laser transitions in the laser gain medium. Examples of ASE absorption materials may include glass (such as phosphate glass, silicate glass, fluorophosphate glass), crystals, ceramics, RTV rubber, epoxy polymers, laminates of these materials or similar materials. These materials may be also doped with absorbing ions. For example, ions which absorb radiation at about 1.06 micrometers are primarily $Cu^{2+}$, $Sm^{3+}$, $Dy^{3+}$, $Cr^{4+}$, and $V^{3+}.Cu^{2+}$. For example, ASE absorption claddings based on polymeric compounds attached to laser gain medium with adhesives is disclosed in U.S. Pat. No. 4,849,036 entitled "Composite Polymer-Glass Edge Cladding for Laser Disks" by Powell et al. ASE absorption cladding preferably has a refractive index closely matched to that of the laser medium to prevent reflection from an edge-cladding interface. In addition, ASE absorption cladding preferably has a coefficient of thermal expansion closely matched to that of the laser gain medium to reduce thermal stresses. ASE absorption cladding may be bonded to selected surfaces of the laser gain medium by an adhesive, fusion bond, diffusion bond, optical contacting followed by heat treatment similar to that described above with respect to the patent by Meissner, or other suitable methods, such as the glass casting process available from Kigre and the sintering process from Konoshima previously discussed. Such bond is preferably highly transparent at the laser wavelength and with a refractive index closely matched to that of the laser gain medium.

"ASE absorption coating" may refer to a thin film bonded onto selected surfaces of the laser gain medium and/or undoped optical medium and having the capability to absorb optical radiation at the wavelengths of one or more laser transitions in the laser gain medium. Such a thin film may be a combination of materials which may have indices of refraction which are greater than the index of refraction of the laser gain medium. Examples of materials may include germanium, silicon, gold, silver, silica, diamond, graphite, dried graphite ink, and some semiconductors and halides. An ASE absorption coating may be produced and applied in accordance with U.S. Pat. No. 5,335,237 entitled "Parasitic Oscillation Suppression in Solid State Lasers Using Absorbing Thin Films" by Zapata et al.

"Composite LGM" may refer to an assembly comprising at least one component made of laser gain medium material, and at least one component made of a group that may include the following materials: 1) an undoped optical medium, 2) an ASE absorption cladding, and 3) an ASE absorption coating. In addition, the gain medium assembly may have reflective, antireflective, and/or dichroic coatings as appropriate for operation as an amplifier of laser radiation.

"Optical aperture" may refer to a maximum transverse dimension of a laser beam, which can be received, amplified, and transmitted by LGM. The term "aperture" used herein may be synonymous to the one used in optics, such as the diameter of the objective of a telescope or other optical instrument.

"Diode bar" may refer to a source of optical radiation suitable for pumping a laser gain medium to a laser transition comprising a 1-dimensional array of semiconductor lasers comprising one or more diodes. The diodes may be mounted in a common substrate and placed on a heat exchanger.

Figure 2A:
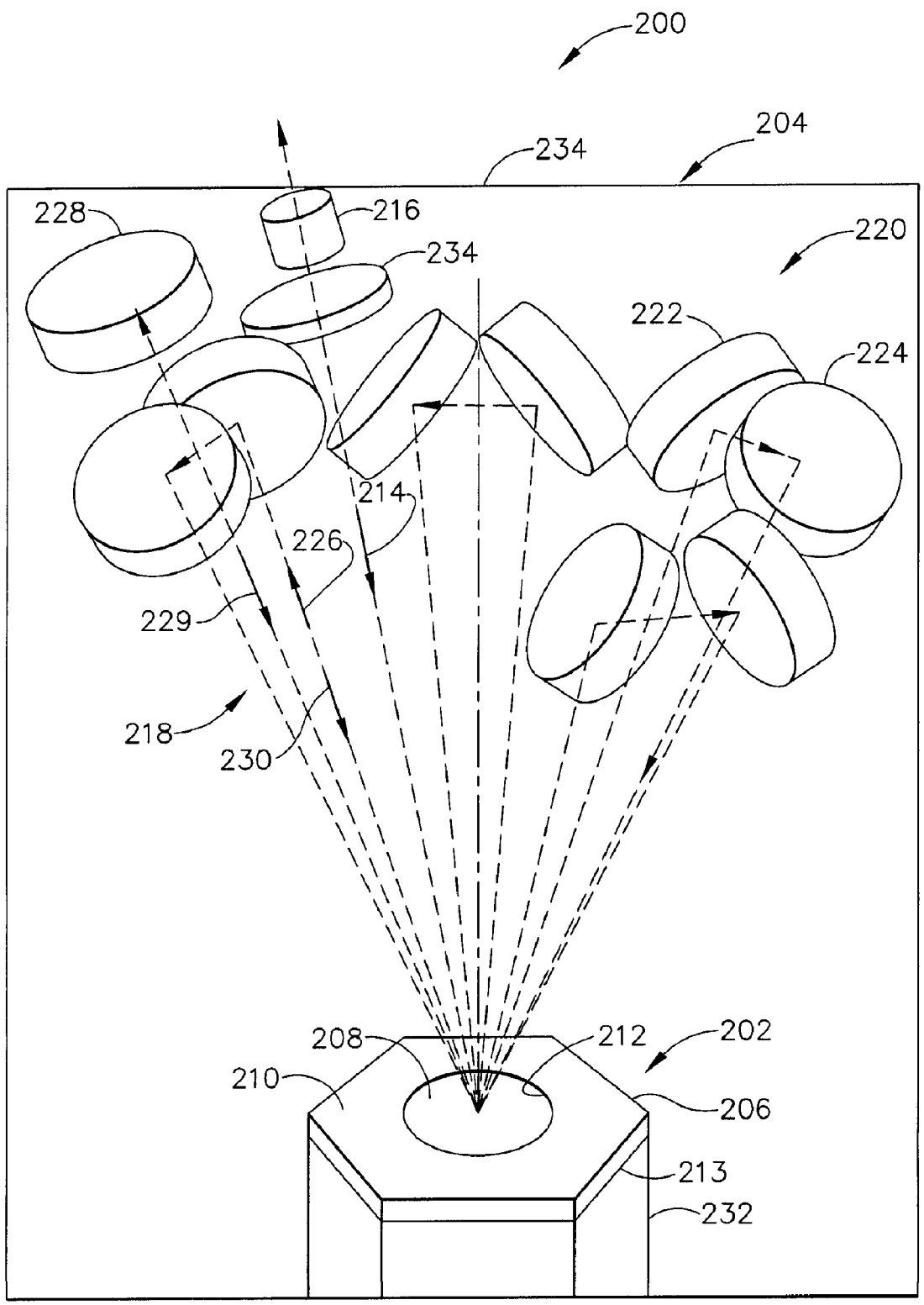
FIG. 2A is an isometric view of a laser system including a solid-state laser and a multi-pass laser resonator in accordance with an embodiment of the present invention.
Figure 2B:
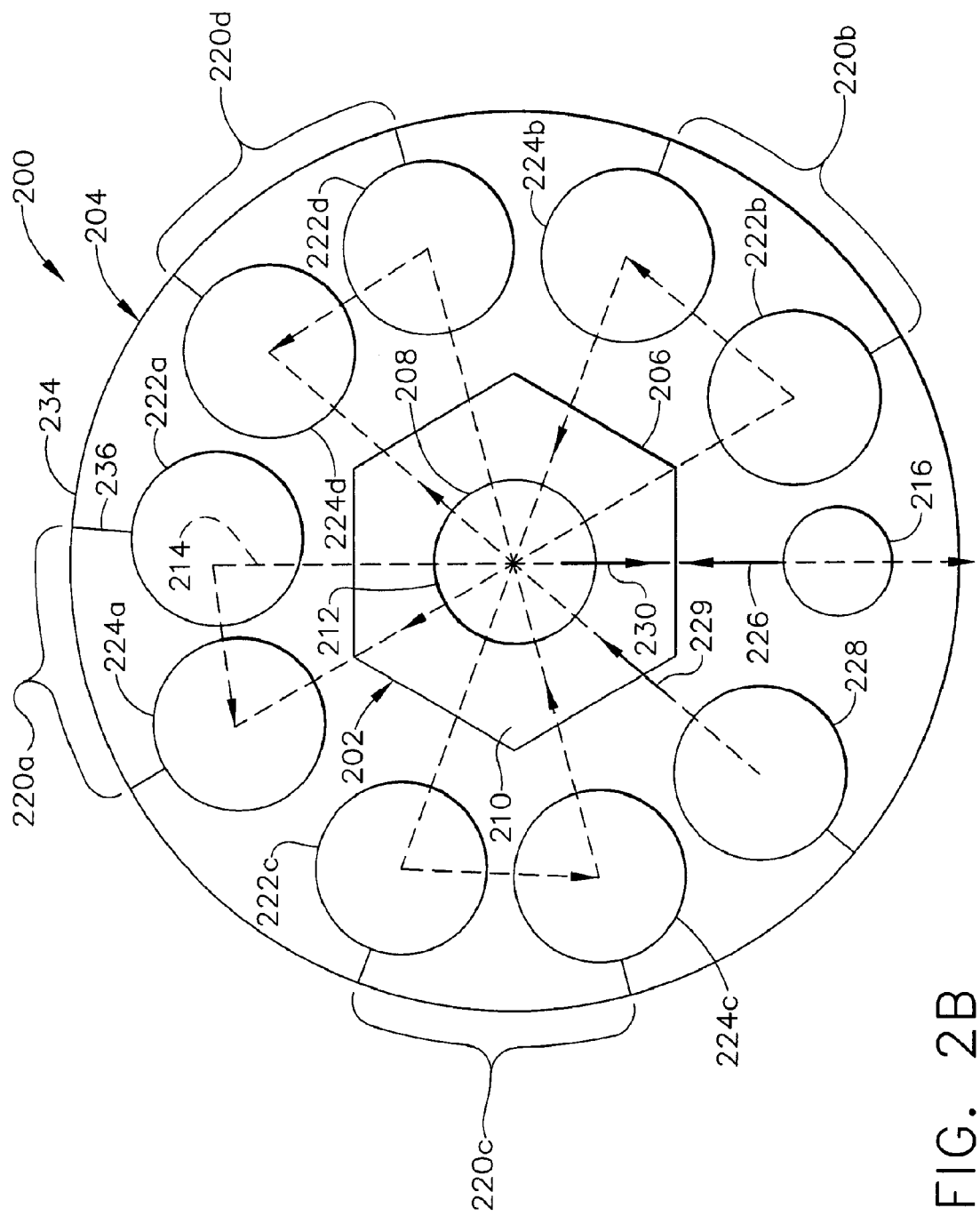
FIG. 2B is a top elevation view of the laser system of FIG. 2A.

Referring to FIGS. 2A and 2B, FIG. 2A is a perspective view of a laser system 200 including a solid-state laser 202 and a multi-pass laser resonator 204 in accordance with an embodiment of the present invention, and FIG. 2B is a top elevation view of the laser system 200 of FIG. 2A. The solid-state laser 202 may include a solid-state laser gain material (LGM) module 206. The LGM module 206 may include a lasing portion 208 and a perimetral portion 210 that may interface with the lasing portion 208. The perimetral portion 210 may be formed in a predetermined shape to substantially prevent spontaneously emitted photons created in the lasing portion 208 and entering the perimetral portion 210 from returning to the lasing portion. Examples of LGM modules that may be used for LGM module 206 are described in U.S. patent application Ser. No. 11/164,185, entitled "High-Gain Solid-State Laser" by Jan Vetrovec et al., filed Nov. 14, 2005, assigned to the same assignee as the present invention and incorporated herein by reference in its entirety and U.S. Patent Publication 2004/0233960, entitled "Diode-Pumped Solid State Disk Laser and Method for Producing Uniform Laser Gain, assigned to the same assignee as the present invention and incorporated herein by reference in its entirety.

The LGM module 202 may form substantially a disk, slab or other form. The lasing portion 208 and the perimetral portion 210 may be integrally formed from a monolithic slab of laser gain material which may be a preferred method of construction if either ytterbium, erbium, holmium, thulium or quasi-3 level ions are used for lasing. In another embodiment of the present invention, the lasing portion 208 and perimetral portion 210 may be constructed from different materials as a composite structure. The perimetral portion 210 may be made from an undoped optical medium, ASE absorption cladding material similar to that previously described, a combination thereof or a similar material. Selected surfaces of the perimetral portion 210 may have ASE absorption coating or the like. In such an embodiment, the perimetral portion 210 may be secured to the lasing portion 208 by diffusion bonding or other suitable technique that will provide optical transmission across an interface 212. A reflective coating 213 may be disposed on a surface of the solid state laser 202 between the solid state laser and a heat exchanger 232.

A feedback laser beam 214 may be directed into the multi-pass resonator through an output coupler 216. The feedback laser beam 214 may be initially directed onto the lasing portion 208 of the LGM module 206 where the beam is amplified and reflected to the multi-pass resonator 204. The multi-pass resonator 204 may include a plurality of relay mirrors 218. The plurality of relay mirrors 218 may be grouped in pairs 220 or some other grouping based on the configuration of the resonator 204. As probably best shown in FIG. 2B, a first mirror 222 and a second mirror 224 of each pair 220 may be positioned to cause the laser beam 214 reflected from the lasing portion 208 of the LGM module 206 to be incident on the first mirror 222 and to be reflected to the second mirror 224. The second mirror 224 may be positioned to cause the laser beam 214 to be reflected back to the lasing portion 208 of the LGM module 206 for further amplification. The laser beam 214 may then be reflected back and forth between each of the pairs 220 of relay mirrors and the LGM module 206 in a forward path, illustrated by an arrow 226 in FIGS. 2A and 2B, through the multi-pass resonator 204 with the laser beam 214 being further amplified with each pass by the LGM module 206.

An end mirror 228 may be positioned to direct an amplified laser beam 229 to the output coupler 216. The output coupler may substantially pass the amplified laser beam 229 from the multi-pass resonator 204. The end mirror 228 may be positioned to direct the laser beam 229 back to the LGM module 206 and to be incident upon the LGM module 206 at an angle of incidence to cause the laser beam 229 to be reflected from the LGM module 206 to the output coupler 216. In another embodiment of the present invention, the end mirror 228 may be positioned to direct the laser beam 229 back through the multi-pass resonator 204 and the plurality of relay mirrors 218 in a reverse path, illustrated by an arrow 230 in FIGS. 2A and 2B, to further amplify the laser beam 214. In this embodiment, the roles of the first and second mirrors 222 and 224 would be reversed from that described above.

In another embodiment of the present invention, one or more of the relay mirrors may include an active mirror amplifier. Examples of active mirror amplifiers are described in U.S. Pat. No. 6,339,605, entitled "Active Mirror Amplifier System and Method for High-Average Power Laser System" by Jan Vetrovec, granted Jan. 15, 2002, assigned to the same assignee as the present invention and incorporated herein by reference in its entirety.

Figure 3:
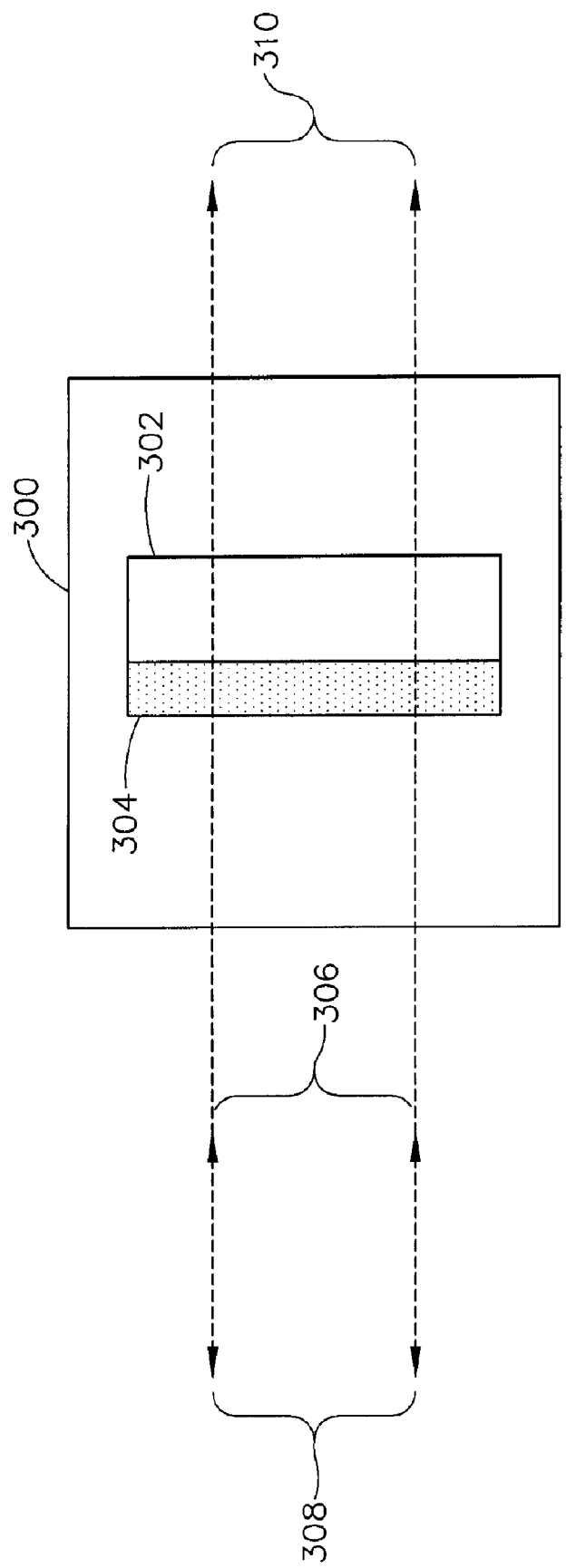
FIG. 3 is an example of an output coupler and feedback assembly in accordance with an embodiment of the present invention.

The output coupler 216 may include a feedback assembly similar to that illustrated in FIG. 3. FIG. 3 is an example of an output coupler and feedback assembly 300 in accordance with an embodiment of the present invention. Other examples of output couplers and feedback assemblies are described in U.S. Pat. No. 6,603,793, entitled "Solid-State Laser Oscillator with Gain Media in Active Mirror Configuration" by Jan Vetrovec, granted Aug. 5, 2003, assigned to the same assignee as the present invention and incorporated herein in its entirety by reference. The output coupler 300 may include a graded reflectivity mirror 302. The graded reflectivity mirror 302 may have a coating 304 with a predetermined radial reflectivity variation. The predetermined radial reflectivity variation of the coating 304 may be one of a parabolic profile, a Gaussian profile, a super-Gaussian profile or the like. A laser beam 306 may be incident upon the graded reflectivity mirror 302 and coating 304. Based on the predetermined radial reflectivity variation of the coating 304, a portion of the laser beam 306 may be reflected back as a feedback beam 308 and the remainder of the light energy may be transmitted as an output beam 310.

Referring back to FIGS. 2A and 2B, the multi-pass resonator 204 may be formed to define a stable configuration or an unstable configuration and more specifically a positive branch unstable configuration. The output coupling 216 and end mirror 228 may be configured to form the multi-pass resonator 204 in the unstable configuration. An example of an output coupler to provide an unstable configuration is described in U.S. Pat. No. 6,603,793. One challenge associated with laser systems employing a gain medium with a large optical aperture is designing a resonator for such systems that will provide a low order mode, such as a transverse electromagnetic TEM or fundamental mode which can efficiently fill the entire aperture. The TEM or fundamental mode essentially has all of the light energy concentrated in a single spot or footprint. To produce such a beam of good beam quality using conventional stable resonators would require a cavity length that would either be impracticably large, would require an expansion telescope or would have to be made in a folded configuration that increases the number of mirrors required. Stable resonators with long cavity or telescopic beam expanders are typically very sensitive to mirror alignment and impractical for integration onto mobile platforms. For these reasons, an unstable resonator provides higher efficiency for extracting available power associated with the cavity mode in a near diffraction-limited beam. Such a near diffraction limited beam may provide a near optimum distribution of radiant energy in the far field as may be required for some applications. The unstable resonator 204 of the present invention may be practiced in a confocal configuration with either positive or negative branch variants.

A passive phase corrector 234 may be disposed in the resonator 204 before the output coupler 216. The passive phase corrector 234 may correct the phase of the laser beam 214 to provide a better quality beam.

The laser system 200 may also include a heat exchanger 232. The LGM module 202 may be thermally coupled to the heat exchanger 232 to withdraw thermal energy from the LGM module 202.

The LGM module 202 and multi-pass resonator 204 may be disposed in a resonator housing 234. The resonator housing 234 may be substantially cylindrical or other shapes may be used as well depending upon the locations of the plurality of mirrors 218 and the platform or application where the system 200 may be employed. The plurality of mirrors 218 may be mounted in the housing 234 using a suitable mounting arrangement 236 to maintain the alignment and positioning of the mirrors relative to each other and to the LGM module 202 so that the laser beam 214 may be properly reflected between the pairs of mirrors 220 and the LGM module 202. The resonator housing 234 and mounting arrangement 236 may form a substantially robust structure so as to provide a durable, mobile resonator for use in multiple applications where generation of a high average power, fundamental mode laser beam may be desired. Accordingly, in one embodiment of the present invention, the LGM module 202 and multi-pass resonator 204 may be usable with or mounted on a mobile platform, that may be represented by the reference numeral or housing 234, such as a military vehicle or the like for applications that may include, but are not necessarily limited to laser target illuminators, designators or similar applications. The present invention may also be used in commercial applications, for example, material processing such as cutting, welding, drilling or like operations. The present invention enables a very simple, compact and inexpensive solid-state laser system with average power between about 5 kilowatts and about 15 kilowatts (although other power ranges may be available) with exceptional beam quality.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof. Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A laser system, comprising:
   a solid-state laser gain material (LGM) module; and
   a multi-pass resonator including a plurality of pairs of relay mirrors, wherein a first mirror and a second mirror of each pair of relay mirrors are positioned to cause a laser beam from the LGM module incident on the first mirror to be reflected directly to the second mirror and to cause the second mirror to reflect the laser beam directly back to the LGM module for further amplification, the laser beam being reflected back and forth directly between a same location on the LGM module and each of the respective pairs of the plurality of pairs of relay mirrors.

2. The laser system of claim 1, wherein the multi-pass resonator comprises an unstable configuration.

3. The laser system of claim 1, wherein the multi-pass resonator comprises a positive branch unstable configuration.

4. The laser system of claim 1, further comprising an output coupler to substantially pass the amplified laser beam from the multi-pass resonator.

5. The laser system of claim 4, wherein the output coupler comprises a graded reflectivity mirror.

6. The laser system of claim 5, wherein the graded reflectivity mirror comprises a coating including a predetermined radial reflectivity variation.

7. The laser system of claim 6, wherein the predetermined radial reflectivity variation of the coating is substantially proportional to one of a parabolic profile, a Gaussian profile and a super-Gaussian profile.

8. The laser system of claim 4, further comprising an end mirror to direct the amplified laser beam to the output coupler.

9. The laser system of claim 1, further comprising an end mirror to direct the laser beam back through the resonator to further amplify the laser beam.

10. The laser system of claim 1, further comprising a heat exchanger thermally coupled to the LGM module.

11. The laser system of claim 1, further comprising a passive phase corrector to correct the amplified laser beam.

12. The laser system of claim 1, wherein the LGM module comprises:
    a lasing portion; and
    a perimetral portion interfacing the lasing portion.

13. The laser system of claim 12, wherein the lasing portion and the perimetral portion are formed from different materials.

14. The laser system of claim 13, wherein the perimetral portion includes a material from a group comprising at least one of an undoped optical medium, ASE absorption cladding and ASE absorption coating.

15. The laser system of claim 1, wherein the LGM module forms substantially one of a disk and a slab.

16. The laser system of claim 1, wherein at least one of the plurality of relay mirrors comprises an active mirror amplifier.

17. The laser system of claim 1, further comprising a mobile platform, wherein the solid-state laser LGM module and multi-pass resonator are mountable on the mobile platform.

18. A laser system, comprising:
    a solid-state laser gain material (LGM) module;
    a multi-pass resonator to provide an amplified fundamental mode laser beam, wherein the multi-pass resonator includes:
       a plurality of pairs of relay mirrors, wherein a first mirror and a second mirror of each pair of relay mirrors are positioned to cause the laser beam from the LGM module incident on the first mirror to be reflected directly to the second mirror and to cause the second mirror to reflect the laser beam directly back to the LGM module for further amplification, the laser beam being reflected back and forth directly between a same location on the LGM module and each of the respective pairs of the plurality of pairs of relay mirrors,
       an output coupler to substantially pass the amplified laser beam from the multi-pass resonator, and
       an end mirror to direct the amplified laser beam to the output coupler.

19. The laser system of claim 18, wherein the multi-pass resonator comprises an unstable configuration.

20. The laser system of claim 18, wherein the multi-pass resonator comprises a positive branch unstable configuration.

21. The laser system of claim 18, wherein the output coupler comprises a graded reflectivity mirror having a coating including a predetermined radial reflectivity variation.

22. The laser system of claim 20, wherein the predetermined radial reflectivity variation of the coating is substantially proportional to one of a parabolic profile, a Gaussian profile and a super-Gaussian profile.

23. A laser system comprising:
    a multi-pass resonator;
    a single solid-state laser gain (LGM) module mounted at one end of the multi-pass resonator; and
    a plurality of pairs of relay mirrors mounted at an opposite end of the multi-pass resonator from the single LGM module, wherein a first mirror and a second mirror of each pair of relay mirrors are positioned to cause a laser beam from the single LGM module incident on the first mirror to be reflected directly to the second mirror and to cause the second mirror to reflect the laser beam back to the single LGM module for further amplification, the laser beam being reflected back and forth directly between a same location on the single LGM module and each of the respective pairs of the plurality of pairs of relay mirrors.

24. The laser system of claim 23, further comprising:
    an output coupler to substantially pass the amplified laser beam from the multi-pass resonator, wherein the output coupler is mounted at an opposite end of the multi-pass resonator from the LGM module;

an end mirror to direct the amplified laser beam to the output coupler; and a substantially cylindrical resonator housing, wherein the LGM module is mounted in a center of the substantially cylindrical resonator housing and the plurality of pairs of relay mirrors, the end mirror and the output coupler are mounted to the substantially cylindrical resonator housing forming a circle about the LGM module disposed in the center.

25. The laser system of claim 24, further comprising a mounting arrangement to mount the plurality of pairs of relay mirrors to the resonator housing to maintain the alignment and positioning of the mirrors relative to each other and to the LGM module when the multi-pass resonator is mounted on a mobile platform.

* * * * *